INVENTOR.
JOSEPH M. COLBY
ATTORNEYS

UNITED STATES PATENT OFFICE 2,560,554

DIFFERENTIAL DRIVE GEARING AND ELECTRODYNAMIC BRAKE CONTROL THEREFOR

Joseph M. Colby, Grosse Pointe, Mich.

Application March 5, 1945, Serial No. 581,013

11 Claims. (Cl. 74—674)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to transmissions and more particularly to improvements in transmissions for motor vehicles.

Heretofore, transmissions for track laying vehicles such as military tanks have comprised a conventional gear type speed change unit combined with mechanical friction brakes arranged to retard the tracks on opposite sides of the vehicle in order to stop the latter, and also arranged to selectively retard the tracks in order to steer the vehicle. Transmissions of this type inherently include numerous disadvantages. Manual gear shifting of the conventional type transmission is extremely difficult during operating conditions in a tank, due partially to its weight and inertia. Furthermore, steering of the tank is extremely difficult and unreliable. For example, in operating a track laying vehicle, even on smooth level ground, it is always necessary to do some corrective steering, since the slightest variation in the construction of the two tracks will cause the vehicle to drift in one direction or the other. If the vehicle is operated upon uneven ground, or upon a sloping road, corrective steering is necessary due to the tendency of the vehicle to turn downhill. Such corrective steering requires application of the friction brakes, either continuously or at very short intervals, resulting in excessive wear of the parts of the brakes. The steering controls usually comprise a pair of levers which are operated by the driver to retard the track on the side of the vehicle in the desired turning direction. Considerable physical effort is required on the part of the driver, and the operation of the steering controls by levers rather than by a steering wheel requires additional training since most drivers have been previously trained to steer vehicles by means of steering wheels. In addition accidents are likely to result due to failure of the braking system from constant use and due to the unnatural type of steering required.

The above and other disadvantages of the conventional type of tank transmission are eliminated by the present invention, in which there is combined into a compact transmission unit of the cross drive type a planetary gear speed change unit, a hydraulic torque converter, and a variable ratio electric steering and braking unit, combined with the final drive differential for the tank. A plurality of planetary gearsets are used, all gears of which are in constant mesh making it possible to shift from one speed range to another without interrupting the power flow from the engine to the tracks. Individual brake bands are associated with the planetary gearsets for selectively energizing the latter to achieve the desired speed ratio.

The use of a hydraulic torque converter coupled to the speed change unit enables the transmission to operate smoothly and efficiently. The torque converter receives engine power at a relatively constant speed and delivers the power in the form of higher torque and low speed or lower torque and high speed. The torque characteristic is fully automatic, being determined entirely by the load condition upon the transmission. No direct mechanical connection exists in the transmission since the power is transmitted by the torque converter through the medium of circulating oil.

Braking and steering are accomplished in the present invention by the use of electro-dynamic or eddy-current brakes, located in the transmission housing and driven from the vehicle engine. These eddy current brakes operate through a differential which is located intermediate the drive sprockets for the tank tracks. Differential steering action is transmitted to the tracks through planetary gearsets located at the outer ends of the main drive shaft of the speed change unit. These planetary gearsets combine the power component from the speed change unit with the steering component from the eddy current brakes, and transmit the combined resultant component to the tracks to drive the latter. The steering component acts through the differential to increase the speed of one track and to simultaneously decrease the speed of the opposite track, resulting in turning the vehicle in one direction or the other. With this construction both normal and corrective steering are permitted without causing excessive wear and the resulting possible failure of the steering and braking system, inasmuch as no mechanical friction exists in the eddy current brakes. Furthermore the vehicle may be steered by means of an electrical control arranged to vary the energy supplied to the eddy current brakes. This control can be arranged to be operated by a steering wheel in a normal steering operation, enabling the steering to be accomplished easily, smoothly and accurately without appreciable physical effort on the part of the driver.

In addition to the ease of operation and the high degree of control which can be maintained over the tank, the above briefly described transmission is extremely advantageous in that it is very compact, and can be arranged with its drive shaft extending transversely of the vehicle intermediate the drive sprockets which are positioned on opposite sides of the vehicle for engagement with the tracks.

Other objects and advantages of the invention will be made more apparent as this description proceeds, particularly when considered in connection with the accompanying drawings in which:

Figure 3 is a fragmentary cross section through a portion of the final drive shaft of the transmission; and Figure 4 is a fragmentary, diagrammatical perspective view of a portion of the transmission, illustrating particularly the steering mechanism thereof.

Figure 1:
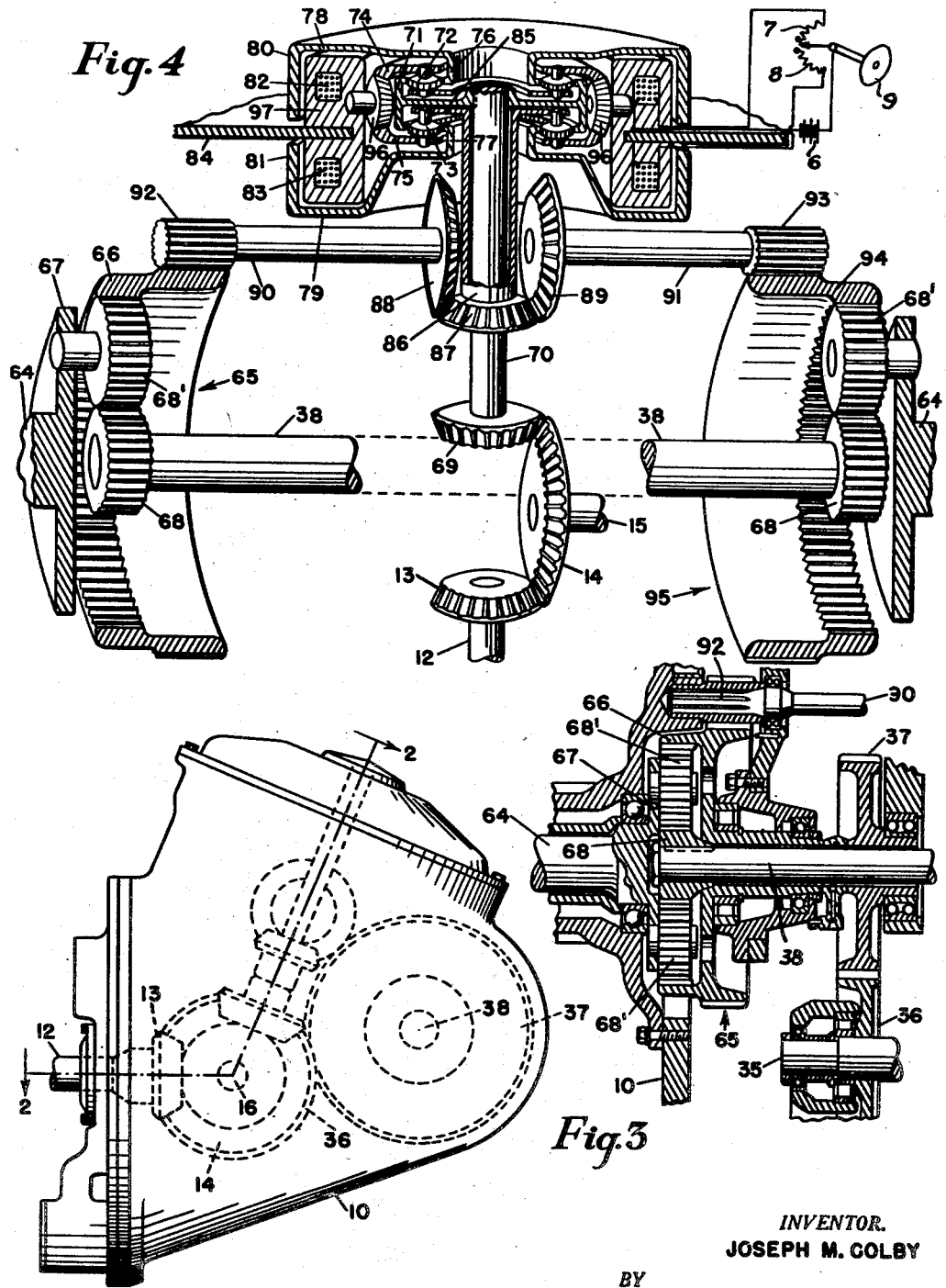
Figure 1 is an end elevation of the transmission.
Figure 2:
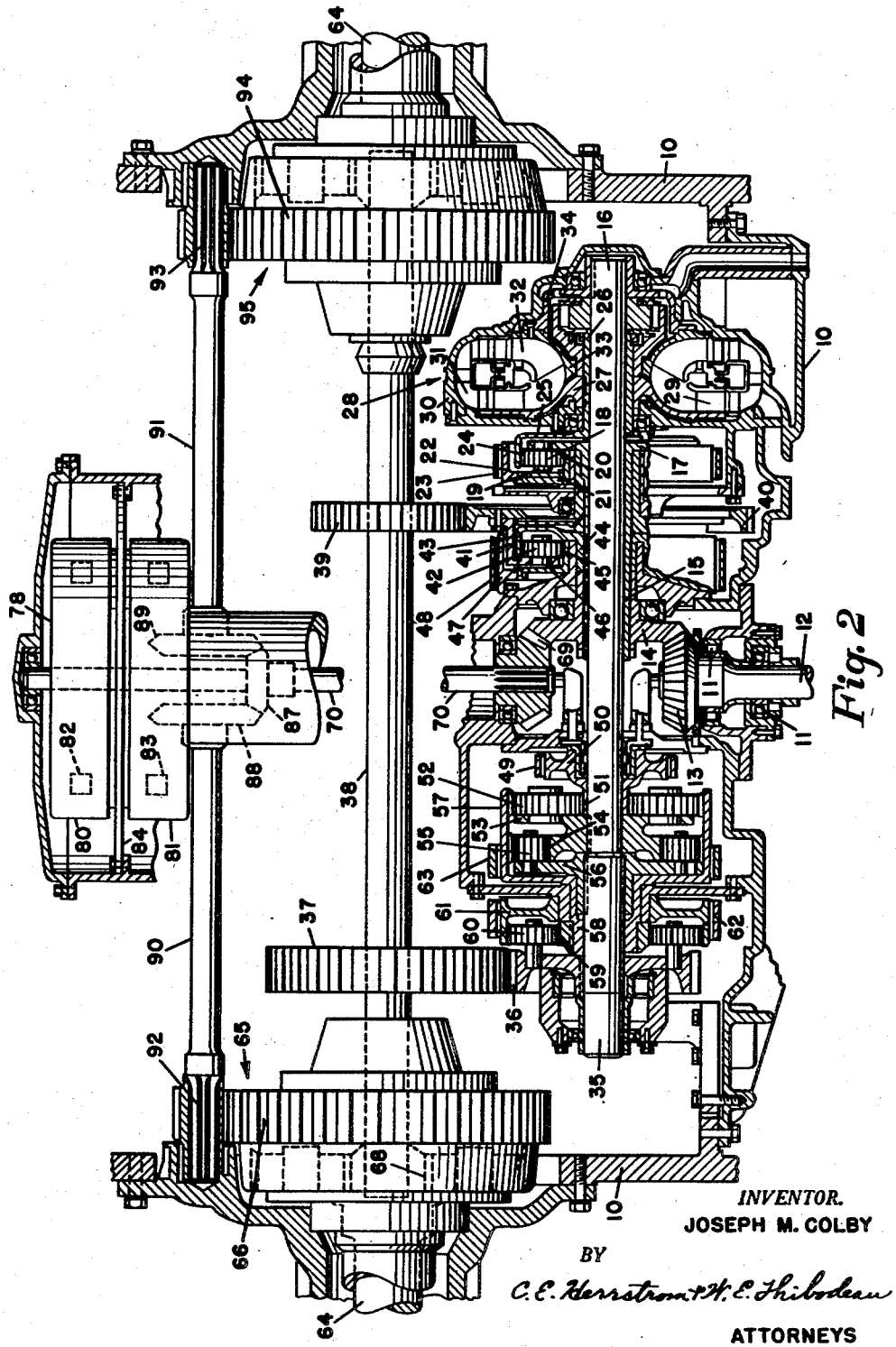
Figure 2 is a transverse cross section, partly in elevation, taken substantially on the plane indicated by the line 2—2 of Figure 1.

Referring now to the drawings, and particularly to Figures 1, 2 and 3, the reference character 10 indicates generally a housing adapted to inclose the transmission of the vehicle. Journaled in bearings 11 carried in the housing is an input shaft 12 adapted to be connected to the engine (not shown) of the vehicle. At the inner end of the input shaft 12 is secured a bevel gear 13 meshing with a bevel gear 14 keyed or otherwise suitable secured to the sleeve 15, the latter being rotatably mounted upon the cross shaft 16. Sleeve 15 terminates in a radially extending flange 17, which acts as a carrier for the planet pinions 18, the latter being rotatably mounted on axles 19 on the flange or carrier 17. A sun gear 20 is mounted for free rotation about the shaft 16 and meshes with the planet pinions 18. The sun gear 20 has a radially extending web 21 formed integrally therewith, to which is secured an axially extending brake drum 22. Surrounding the brake drum 22 is a brake band 23 which is adapted to be effectively clamped around the drum 22 by any of the well known means. For example, the band 23 may be mechanically actuated by manual means and contracted into braking engagement with the drum, or hydraulic power or servo mechanism may be utilized to enable the braking to be accomplished without the expenditure of appreciable physical effort on the part of the operator.

Surrounding the planet pinions 18 and meshing therewith is an annulus gear 24, the latter being connected by a web 25 to a sleeve 26 surrounding the cross shaft 16.

The sleeve 26 is connected by means of a key to the impeller or pump 27 of the hydraulic torque converter 28. The impeller 27 is annular in shape and carries a plurality of vanes 29 adjacent its periphery. The housing 30 of the torque converter 28 is rigidly mounted upon the frame 10 of the transmission and carries a plurality of vanes 31 adapted to redirect the fluid pumped by the impeller 27 and to cause the fluid to impinge upon the vanes 32 of the annular runner 33. The runner 33 is carried by the hub 34, which in turn is connected to the end of the cross shaft 16.

From the foregoing it will be seen that the carrier 17 carrying the planet pinions 18 is driven by the motor of the vehicle through the input shaft 12, bevel gears 13 and 14, and sleeve 15. When the brake band 23 is released or disengaged from the brake drum 22, the sun gear 20 is free to rotate and no power is transmitted through the annulus gear 24 and consequently no power is supplied to the impeller 27 of the torque converter 28. When, however, the brake band 23 is actuated and contracted into engagement with the drum 22, the sun gear 20 is locked against rotation and the annulus gear 24 is rotated by the pinions 18, thus driving the impeller. Inasmuch as the housing 30 of the torque converter is filled with a suitable fluid, rotation of the impeller 27 and its vanes 29 causes a circulation of fluid from vanes 29 through the vanes 31 secured to the housing 30 and into the vanes 32 carried by the runner 33, causing the latter to rotate, driving the shaft 16. There being no mechanical connection between the elements of the torque converter it will be noted that power is transmitted smoothly and with great flexibility. The torque converter has the ability to deliver at its output side torque of varying amount, depending upon the load placed upon the output. In other words the torque converter is driven by the vehicle engine at a relatively constant speed and delivers power in the form of a higher torque at low speeds or a lower torque at high speeds. The variable torque characteristic of the converter is automatic, being controlled and determined by the load placed upon the output of the converter. Thus, in a suitable installation the torque converter provides an effective means for transmitting power and achieving the desired torque for various operating conditions. This is particularly advantageous in the transmission of a military tank, in which the extreme weight of the vehicle and the severe conditions under which it must operate, particularly during combat, render the usual gear type transmission unsuited for maximum efficiency and maneuverability.

It will be seen that with the band 23 engaged, the torque converter 28 is operative, and that with the brake band disengaged the torque converter is disconnected from the power train of the transmission. This not only provides the proper speed ratio for the input to the torque converter but also enables the latter to be disconnected from the transmission under certain circumstances, as for example at high speed when a direct drive is desired and the characteristics of a torque converter are not as favorable as at lower speed when high torque is required.

Coaxial with the shaft 16, but entirely separate therefrom and positioned beyond the end of the latter, is a shaft 35, upon which is keyed a gear 36 meshing with a gear 37 carried upon and fixed to the drive shaft 38, the latter being journaled in the housing 10. The drive shaft 38 is adapted to be coupled to the drive sprockets of the tank by means to be more fully described hereinafter. The drive shaft 38 also carries a second gear 39 meshing with high speed gear 40 carried by the carrier 41. Rotatably mounted upon the carrier 41 are a plurality of planet pinions 42 meshing with an annulus gear 43, the latter having a hub 44 secured to the sleeve 15. Also meshing with the planet pinions 42 is a sun gear 45 having a radially extending web 46 to which is secured a brake drum 47 surrounded by high speed brake band 48.

When it is desired to operate the transmission at the high speed range, the brake band 48 is suitably energized and contracted upon the brake drum 47 thus locking the sun gear 45 in stationary position. At this time power from the driven sleeve 15 is transmitted through the annulus gear 43 and the planet pinions 42 to the carrier 41, upon which is secured the gear 40. The gear 40 then drives the drive shaft 38 through the medium of the gear 39. With the brake band 48 in the off or released position the sun gear 45 is free to rotate and no power is transmitted through this planetary gearset to the drive shaft 38.

Intermediate speed is achieved by energizing the brake band 49 and actuating the latter into frictional engagement with a brake drum 50 which is freely rotatably mounted and has a hub 51 forming a sun gear meshing with planet pinions 52 journaled upon the carrier 53. The carrier 53 is keyed to the shaft 16 and has integrally formed therewith a sun gear 54 meshing with planet pinions 55 journaled upon the carrier 56, the latter being secured to one end of the shaft 35. The planet pinions 52 and 55 each mesh with a double annulus gear 57 which has a hub 58 carrying a sun gear 59 meshing with planet pinions 60 journaled upon gear 36. Surrounding the planet pinions 60 and meshing therewith is an annulus gear 61 which also forms a brake drum for the reverse brake band 62. The double annulus gear 57 functions as a brake drum for the brake band 63 surrounding the latter. With the brake bands 62 and 63 released the annulus gears 57 and 61 are free to rotate.

The power flow through the planetary speed change unit and the torque converter will be briefly outlined for each of the various speed ranges. In low speed the converter band 23 and the low speed band 63 are applied to their respective brake drums, locking the latter against rotation, while each of the other brake bands are in the off position. With the converter band 23 applied power flows through the torque converter 28 as previously described, driving the cross shaft 16. With the annulus gear 57 locked by reasons of the frictional engagement with brake band 63, power from shaft 16 is transmitted through the sun gear 54, planet pinions 55, carrier 56, shaft 35, and gears 36 and 37 to the drive shaft 38.

In intermediate speed the converter band 23 is applied so that power from the engine is transmitted through the torque converter to cross shaft 16. The intermediate speed band 49 is also applied locking drum 50 and sun gear 51 against rotation causing the power from shaft 16 to be transmitted through the carrier 53 and the planet pinions 52 to the annulus gear 57 and also through a branch path comprising the sun gear 54 and the planet pinions 55. The power from both branches is combined and transmitted through carrier 56 to shaft 35 and then to the drive shaft 38 through the gears 36 and 37. The speed of rotation of carrier 56, under these conditions, will be the algebraic sum of the rotations of shaft 16, of annulus gear 57 relatively to shaft 16, and of carrier 56 relatively to gear 57.

As previously described high speed is obtained by the application of band 48 resulting in a transmission of power through gears 40 and 39 to the drive shaft 38. At this time the converter band 23 is off, as are the other bands except 48, and no power is transmitted through the torque converter.

In reverse speed the converter band 23 and the reverse band 62 are applied. The brake drum and annulus gear 61 is thus held against rotation by the aforesaid application of band 62 and power transmitted through the torque converter to shaft 16 flows through sun gear 54 and planet pinions 55, at which point the power flow is divided into two branches, one through the planet carrier 56 and shaft 35 to gear 36 and the other through the annulus gear 57, sun gear 59 and planet pinions 60 to the gear 36, at which point the power is combined to drive gear 37. In other words, the net rotation of gear 36 will be the algebraic sum of the rotation of annulus gear 57 relatively to shaft 16 due to the drive through planet pinions 55, and the rotation of carrier 56 relatively to annulus gear 57 due to the drive through planet pinions 60.

Actuation of the bands into frictional clamping engagement with the drums for the various planetary gearsets may be accomplished by any suitable actuating mechanism of conventional design (not shown), as for example by means of hydraulic cylinders and pistons connected to a suitable source of fluid power and controlled by hydraulic valves from the operator's position in the tank turret.

From the foregoing it will be seen that the drive shaft 38 is adapted to be driven from the power supplied by the engine at any one of three speeds forward and one reverse, and that the torque converter may be coupled into the circuit as desired, being preferably used in all speeds except high forward.

Reference is now made to Figure 3, which illustrates in detail the mechanism whereby power from the drive shaft 38 is transmitted to shafts 64, the latter being connected by suitable means to the drive sprockets (not shown) of the tank tracks. Inasmuch as the mechanism at opposite sides of the transmission for connecting shaft 38 to the shafts 64 are identical, only the one at the left hand side of Figure 2 will be described in detail.

The planetary gearset 65 comprises three principal elements, namely, the annulus gear 66 rotatably mounted upon shaft 38, the planet pinion carrier 67 secured to shaft 64, and the sun gear 68 secured to the drive shaft 38.

The sun gear 68 being connected to the drive shaft 38 forms the power input to the planetary gear set 65. The carrier 67 being connected to shaft 64 forms the power output. The annulus gear 66 is arranged to be driven in accordance with the steering control desired and forms the input for the steering component.

The mechanism comprising the steering portion of the transmission will now be described. Reference is made to Figure 2 and particularly to Figure 4, the latter showing diagrammatically this portion of the transmission. Power for the steering mechanism is transmitted from the input shaft 12 through bevel gears 13, 14 and 69 to shaft 70. Shaft 70 is connected to the double internal or annulus gear 71. Accordingly annulus gear 71 is constantly driven directly from the vehicle engine. Meshing with the annulus gear 71 are two sets of planet pinions 72 and 73 journaled upon the carriers 74 and 75 respectively. With the carriers 74 and 75 normally stationary, rotation of the pinions 72 and 73 by the annulus gear 71 results in reverse rotation of the sun gears 76 and 77 respectively. Sun gears 76 and 77 are connected by radially extending webs 78 and 79 respectively to brake drums 80 and 81.

Arranged to act upon the brake drums 80 and 81 and to retard the latter are a pair of annular field coils 82 and 83 held in stationary position upon a web 84 attached to the housing of the transmission. Energization of the field coils is obtained from a suitable electrical power source 6 and may be controlled by any suitable means, such as rheostats 7 and 8 arranged to selectively vary the power input to the respective field coils 82 and 83. When current is supplied to one of the field coils a magnetic field is set up surrounding the coil. The adjacent brake drum rotates through this magnetic field and generates eddy current retarding the rotation of a drum. If desired, the control means for varying the power supplied to the field coils may be actuated by a steering wheel 9 so that the driver of the vehicle may use a normal steering action in regulating the operation of the eddy current brakes.

It will be noted that the planet pinions 73, which are journaled in the carrier 75, are also journaled in a carrier 85 which will of necessity rotate in unison with the carrier 75. The carrier 85 is formed upon one end of a sleeve 86 surrounding the shaft 70 and carrying at its lower end a bevel gear 87. Meshing with the bevel gear 87 are a pair of bevel gears 88 and 89 mounted upon the inner ends of shafts 90 and 91 respectively. Shafts 90 and 91 carry at their outer ends drive pinions 92 and 93 respectively which mesh with external gear teeth formed upon the annulus gear 66 of the planetary gearset 65 at one side of the transmission, and with external teeth formed upon the annulus gear 94 of the planetary gearset 95 at the opposite side of the transmission.

When neither of the field coils is energized the brake drums, sun gears, planet pinions and carriers rotate freely under no load. At this time bevel gear 87 is stationary and consequently drive pinions 92 and 93 are held stationary preventing rotation of the annulus gears 66 and 94. Thus the shafts 64 for the drive sprockets are driven directly by the drive shaft 38 through the medium of sun gears 68, planet pinions 68' and carriers 67.

Upon the energization of one of the field coils 82 or 83, the rotation of the adjacent brake drum will be retarded. If, for example, field coil 83 is energized then the adjacent brake drum 81 will be retarded and likewise sun gear 77 will be slowed down. This exerts a driving force upon the carrier 85 which in turn drives sleeve 86 and bevel gear 87. Bevel gears 87, 88 and 89 form in effect a differential, and rotation of bevel gear 87 in one direction results in simultaneous rotation of shafts 90 and 91 at equal speeds but in opposite directions. This results in driving annulus gear 66 in one direction through pinion 92 and annulus gear 94 in the opposite direction through pinion 93. The result of this differential action is to slow down the speed of the shaft 64 attached to one of the planetary gearsets 65 and 95 simultaneously correspondingly increase the speed of the shaft attached to the other of the planetary gearsets.

The magnitude of the steering component may be varied by varying the energization of the field coils. If, for example, only a small turning movement is required then only a small amount of current need be applied to the field coil, resulting in a relatively small speed differential between shafts 90 and 91. If, however, a sharper turning radius is desired then a great current can be supplied to the field coil resulting in a greater retardation of the adjacent brake drum and causing a larger speed differential between the shafts 90 and 91.

If it is desired to turn the vehicle in the opposite direction current is supplied to the field coil 82 instead of to field coil 83. This results in retarding the speed of the adjacent brake drum 80 and also the sun gear 76. The resulting force is transmitted through the planet pinions 72 to the carrier 74 and then to carrier 75 through the bevel gears 96, the latter being journaled in the stationary frame 97. It will be observed that carriers 75 and 85 will be rotated in the reverse direction and will rotate sleeve 86 and bevel gear 87 in a direction opposite to the direction of rotation caused by the energization of field coil 83. Through the bevel gears 88 and 89 of the differential the shafts 90 and 91 will be rotated in opposite directions to each other and oppositely to their direction of rotation when coil 83 is energized. This again results in varying the speeds of the planetary gearsets 65 and 95, retarding one drive sprocket and accelerating the other drive sprocket, thus turning the vehicle. From the foregoing it will be apparent that the vehicle can be steered in either direction and in any desired turning radius by selective energization of the field coils 82 and 83, only one of which is energized at a time.

The steering control is effortless inasmuch as there is no mechanical friction between the field coils and the adjacent brake drum. Consequently steering is accomplished smoothly and the vehicle can be steered without subjecting the same to unnecessary loads resulting from uneven or jerky operation. In addition the mechanism readily adapts itself to a conventional type of manual steering control such as a steering wheel.

When utilizing the ordinary tank transmission with mechanical friction type steering continual corrective steering causes excessive heat and wear of the brake surfaces and frequently results in failure of the steering and brake mechanism. With the present mechanism however, corrective steering is easily accomplished without damage to the braking mechanism since eddy current couplings have no frictional parts and the necessary slippage is obtained without wear of the parts of the coupling.

The steering control of the present invention is continuously variable and accurate. Effortless steering is therefore possible. Furthermore, the transmittal of power through the hydraulic torque converter used in my transmission results in an extremely smooth and flexible drive, and achieves desirable torque and efficiency characteristics. In addition the use of a torque converter materially increases the maneuverability and performance of the vehicle, factors which are of extreme importance in a military combat tank. Maneuverability and increased performance are also enhanced by the use of planetary gearsets. These planetary gearsets are constantly in mesh and are brought into operative relation by the application of friction bands. Shifting from one speed range to another is thereby greatly simplified and can be accomplished instantly without interrupting the power flow from the engine to the tracks.

The transmission of the present invention combines into a compact unit a planetary speed change unit in combination with a torque converter and an eddy current steering mechanism. This results in a transmission having superior performance characteristics and also enables the mechanism to be compactly arranged between the drive sprockets of a tank and to occupy a minimum of space. Space being at a premium in a combat tank, the importance of this will be readily appreciated.

Although I have shown and described certain embodiments of my invention, it will be understood that I do not wish to be limited to the exact construction shown and described, but that various changes and modifications may be made without departing from the spirit and scope of my invention, as defined in the appended claims.

What I claim is:

1. In a motor vehicle having an engine and a pair of ground engaging drive members on opposite sides of the vehicle, an input shaft driven by the engine, a drive shaft, a speed change unit connected to drive said drive shaft and operable to vary the speed ratio between said input and drive shafts, a hydraulic torque converter for transmitting torque from said input shaft to said speed change unit, differential means connecting said drive shaft to said ground engaging drive members, and electrodynamic braking means arranged to vary the speed of one side of said differential means to steer the vehicle.

2. In a motor vehicle having an engine and a pair of ground engaging drive members on opposite sides of the vehicle, an input shaft driven by the engine, a drive shaft, a planetary type speed change unit connected to drive said drive shaft, means for selectively locking certain elements of said planetary speed change unit to vary the speed ratio between said input and drive shafts, a hydraulic torque converter for transmitting torque from said input shaft to said speed change unit, means including differentials connecting said drive shaft to said ground engaging drive members respectively, a source of steering power, and a connection from said source to one side of each of said differentials, said connection including electrodynamic braking means adapted to differentially actuate said sides of said differentials 3. In a motor vehicle having an engine and a pair of ground engaging drive members on opposite sides of the vehicle, an input shaft driven by the engine, a drive shaft, a speed change unit connecting said input and drive shafts for varying the speed ratio between said input and drive shafts, a hydraulic torque converter connected to said unit intermediate said input shaft and speed change unit, means for selectively coupling said torque converter to said input shaft to transmit the torque from said input shaft to said drive shaft, means including first and second differentials connecting said drive shaft to said ground engaging drive members respectively, a source of steering power, and a connection from said source to one side of each of said first and second differentials, said connection including electrodynamic braking means adapted to selectively and differentially actuate said sides of said differentials.

4. In a motor vehicle having an engine and a pair of ground engaging drive members on opposite sides of the vehicle, an input shaft driven by the engine, a drive shaft, a speed change unit connected to drive said drive shaft, means associated with said speed change unit for varying the driving speed ratio thereof, a hydraulic torque converter for transmitting torque from said input shaft to said speed change unit, means including differentials connecting said drive shaft to said ground engaging drive members respectively, a rotatable braking element adapted to be driven by said input shaft, electromagnetic means for retarding said rotatable braking element, and a drive connection between said rotatable braking element and one side of said differentials actuated by the retardation of said braking element to vary the relative speed of said ground engaging drive members to steer the vehicle.

5. In a motor vehicle having an engine and a pair of ground engaging drive members on opposite sides of the vehicle, an input shaft driven by the engine, a drive shaft, a planetary type speed change unit connected to drive said drive shaft, means for selectively locking certain elements of said planetary speed change unit to vary the driving speed ratio to said drive shaft, a hydraulic torque converter connected to drive said speed change unit, means for selectively coupling said torque converter to said input shaft to transmit the torque from said input shaft to said unit, first and second differentials connecting said drive shaft to said ground engaging drive members respectively, means for differentially actuating said differentials including a rotatable braking element adapted to be driven by said input shaft, electromagnetic means for retarding said rotatable braking element, and a drive connection between said rotatable braking element and one side of said differentials actuated by the retardation of said braking element to vary the relative speed of said ground engaging drive members to steer the vehicle.

6. In a motor vehicle having an engine and a pair of ground engaging drive members on opposite sides of the vehicle, an input shaft driven by the engine, a drive shaft providing a power output, a speed change unit connected to drive said drive shaft, means associated with said speed change unit for varying the driving speed ratio to said drive shaft, a hydraulic torque converter for transmitting torque from said input shaft to said unit, a power drive including electrodynamic braking means arranged to be energized to provide relatively oppositely directed power outputs in accordance with the desired steering of the vehicle, and means for differentially combining the respective power outputs of said power drive and of said drive shaft into resultant power components, and means for transmitting the resultant power components to said ground engaging drive members to drive the latter at relatively different speeds.

7. In a motor vehicle having an engine and a pair of ground engaging drive members on opposite sides of the vehicle, an input shaft driven by the engine, a drive shaft, a speed change unit connected to drive said drive shaft, means associated with said speed change unit for varying the speed ratio output to said drive shaft, a hydraulic torque converter for transmitting torque from said input shaft to said speed change unit, electrodynamic braking means arranged to be energized in accordance with the desired steering of the vehicle, an output shaft for said electrodynamic braking means, a pair of auxiliary shafts driven in opposite directions by said output shaft, and a planetary gearset at each side of said vehicle each said gearset being connected to a respective one of the ground engaging drive members at that side, said drive shaft and said auxiliary shafts being connected to said planetary gearsets in such a manner that their respective power components are combined in the planetary gearsets to differentially drive the ground engaging drive members upon energization of said braking means.

8. In a self-propelled vehicle having a prime mover and a pair of ground-engaging traction members on opposite sides of the vehicle, an input shaft connected to be driven by said prime mover, a hydraulic torque converter having an impeller and a runner, a first planetary gearset selectively operable to connect said input shaft and impeller, a drive shaft, selective variable speed means operable to drivingly connect said runner and drive shaft, first and second differential means each having one side driven by said drive shaft and a second side connected to drive a respective one of said traction members, a source of steering power, and connections from said source to differentially drive the third sides of said differential means, said connections including electrodynamic braking means, and manually-controlled steering means operable selectively to energize said braking means.

9. In a self-propelled vehicle having an engine and ground-engaging drive members on opposite sides thereof, an input shaft connected for operation by said engine, a hydraulic torque converter having an impeller and a runner, means selectively operable to connect said impeller to said input shaft, a drive shaft, variable speed transmission means connected with said runner selectively to drive said drive shaft at low, intermediate or reverse speeds, high speed gearing connected to said drive shaft, means operable to directly connect said high speed gearing with said input shaft, first and second planetary gear sets each having a sun gear connected to respective ends of said drive shaft, a planetary pinion connected to drive a respective one of said drive members, and an annulus gear meshing with its planetary pinion, steering shafts connected for opposite rotation, means drivingly connecting each said steering shaft with a respective annulus gear, a common source of steering power, a pair of differentials connected for differentially actuating said steering shafts each of said pair of differentials having one side driven from said source of power, said differentials having their second sides interconnected for opposite rotation, a pair of braking elements each connected to a respective one of the third sides of said pair of differentials, first and second electromagnets each energizable to retard a respective braking element and to thereby transmit a respectively oppositely directed component of said steering power to each of said drive members, and manually-controlled steering means effective selectively to energize said electromagnets to thereby steer said vehicle by the resultant actuation of said drive members at relatively different speeds.

10. In an automotive vehicle having a pair of ground-engaging members at opposite sides of said vehicle, a shaft adapted to be power driven at selectively variable speeds, first and second differentials each having one side connected to be driven by said shaft and a second side connected to drive said ground-engaging members, respectively, a power driven steering mechanism shaft, third and fourth differentials, connected to convey power from said steering mechanism shaft to the third sides of said first and second differentials, and electro-magnetic braking means operable selectively to retard respective sides of said third and fourth differentials to thereby differentially vary the motion conveyed from said steering mechanism shaft to the third sides of said first and second differentials.

11. In a motor vehicle having a drive shaft, first and second ground-engaging drive members on opposite sides of said vehicle and power driven variable speed transmission means connected to drive said drive shaft, first and second differentials, each having one side connected to actuate a respective one of said drive members, and second sides connected for operation by said drive shaft, a source of steering power, third and fourth differentials each having a side connected to be driven by said source, and second sides interconnected for relatively opposite rotation, first and second braking members connected with the third sides of said third and fourth differentials, respectively, electro-magnetic means energizable to selectively restrain said braking members, manually-controlled steering means for effecting said energization, and a driving connection from the second side of one of said third and fourth differentials to each of third sides of said first and second differentials.

JOSEPH M. COLBY.

REFERENCES CITED

The following references are of record in the file of this patent:

UNITED STATES PATENTS

| Number | Name | Date |
|---|---|---|
| 1,247,725 | Schneider | Nov. 27, 1917 |
| 1,668,352 | Brackenbury et al. | May 1, 1928 |
| 2,272,434 | Schjolin | Feb. 10, 1942 |
| 2,272,934 | Cotal | Feb. 10, 1942 |
| 2,336,912 | Zimmermann | Dec. 14, 1943 |

FOREIGN PATENTS

| Number | Country | Date |
|---|---|---|
| 504,823 | France | Apr. 23, 1920 |